Jan. 10, 1928.
E. CANNON
1,656,034
HYDRAULIC CONTROL SYSTEM
Filed Nov. 10, 1925    5 Sheets-Sheet 4
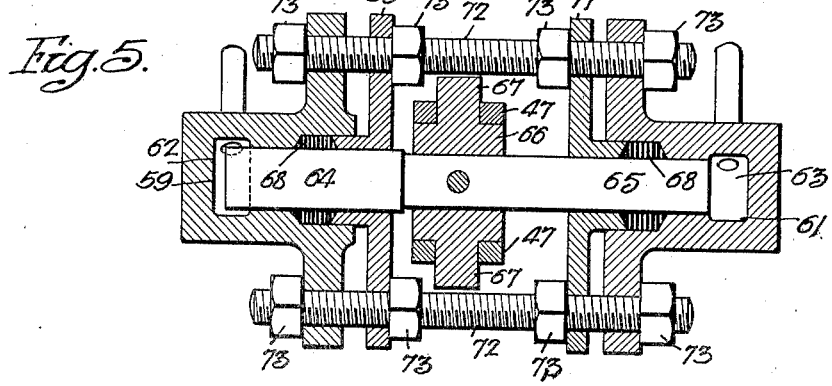
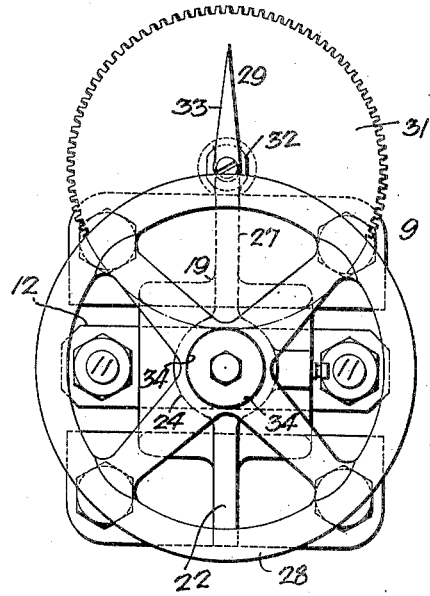
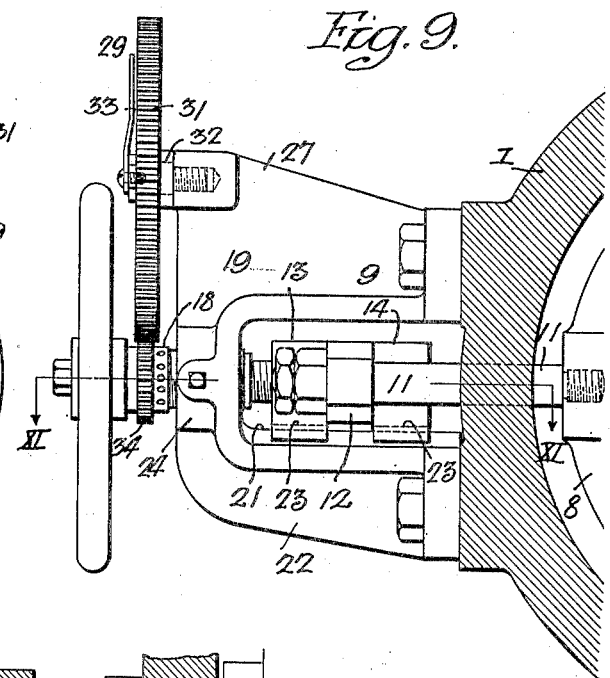
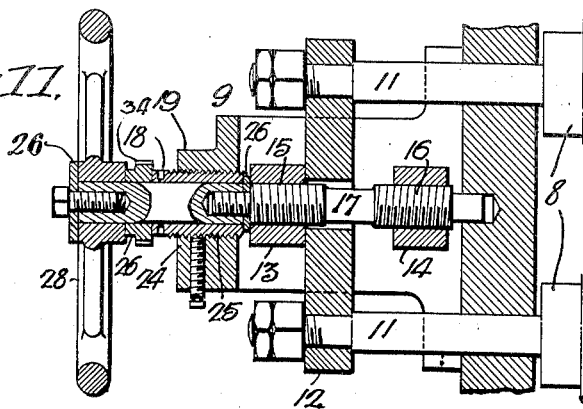
Inventor-
Earl Cannon
by his Attorneys-
Howson & Howson Jan. 10, 1928. 1,656,034
E. CANNON
HYDRAULIC CONTROL SYSTEM
Filed Nov. 10, 1925 5 Sheets-Sheet 5
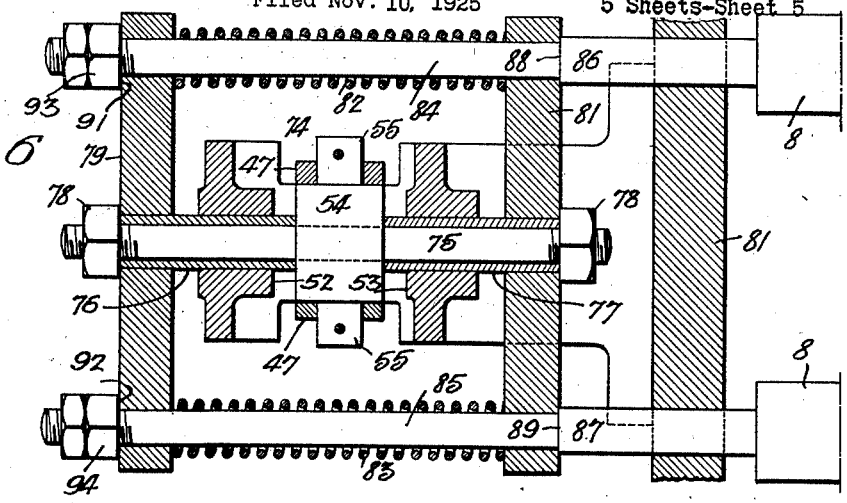
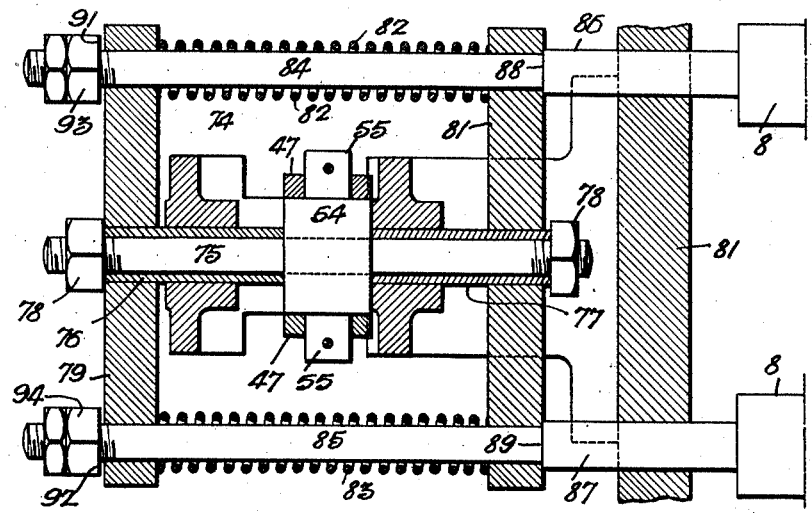
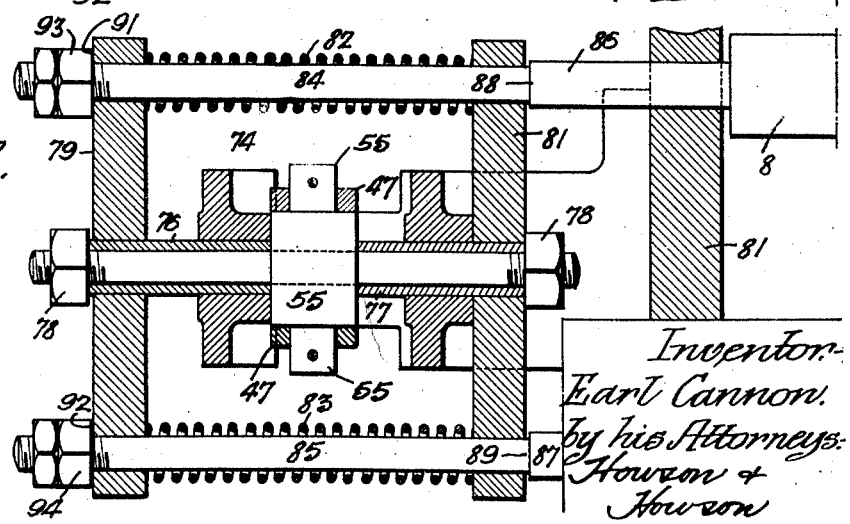
Inventor:
Earl Cannon.
by his Attorneys:
Howson & Howson Patented Jan. 10, 1928.

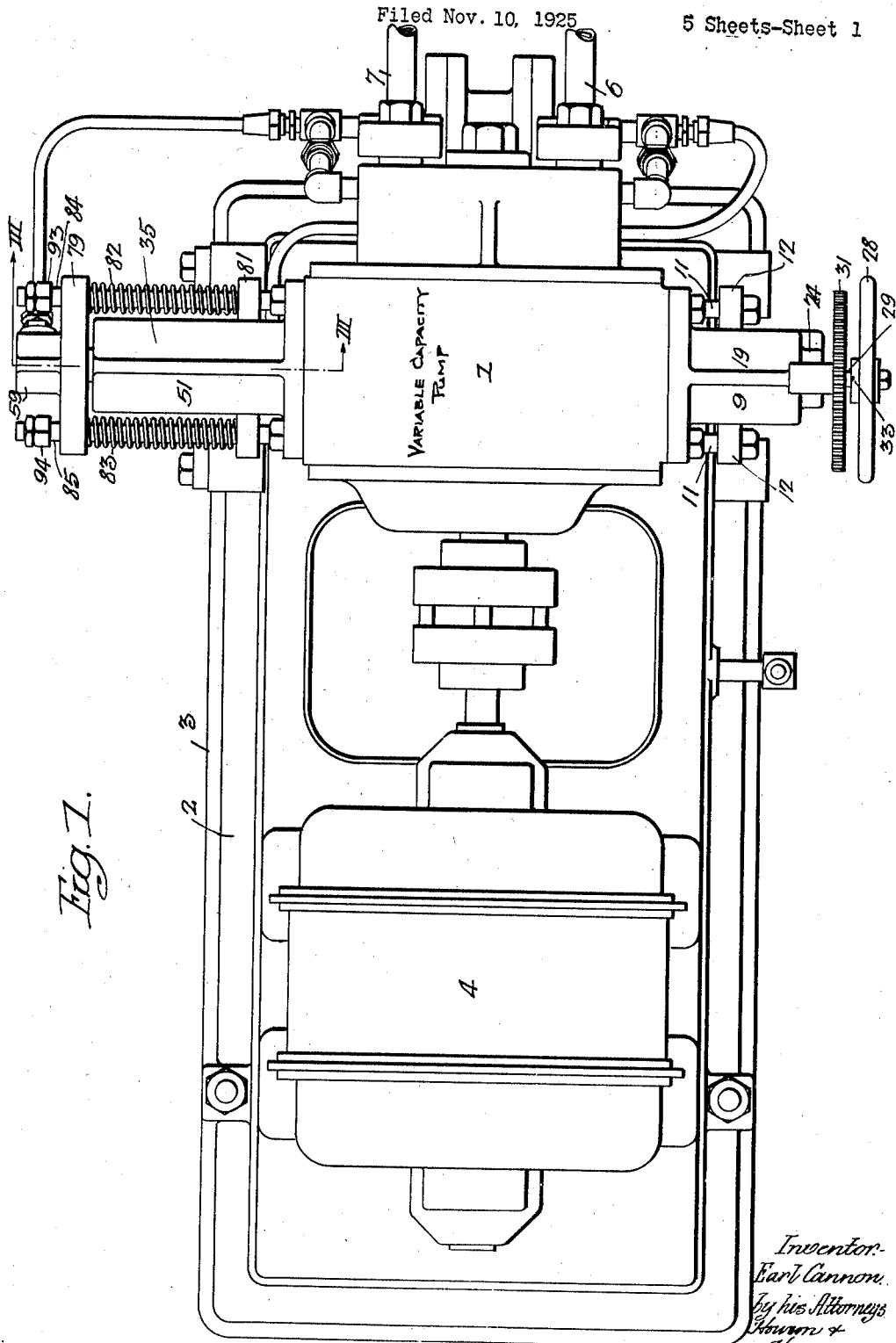

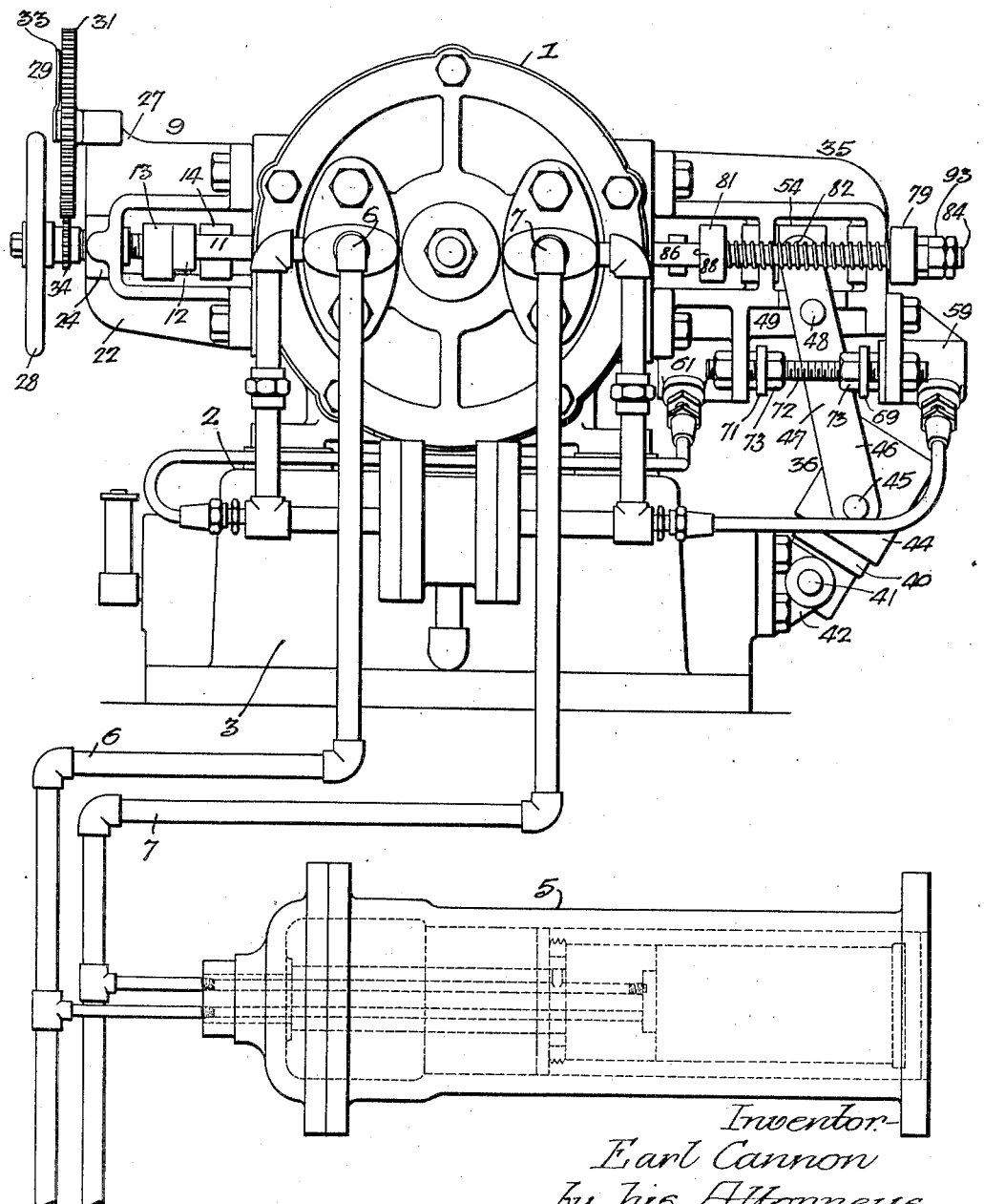

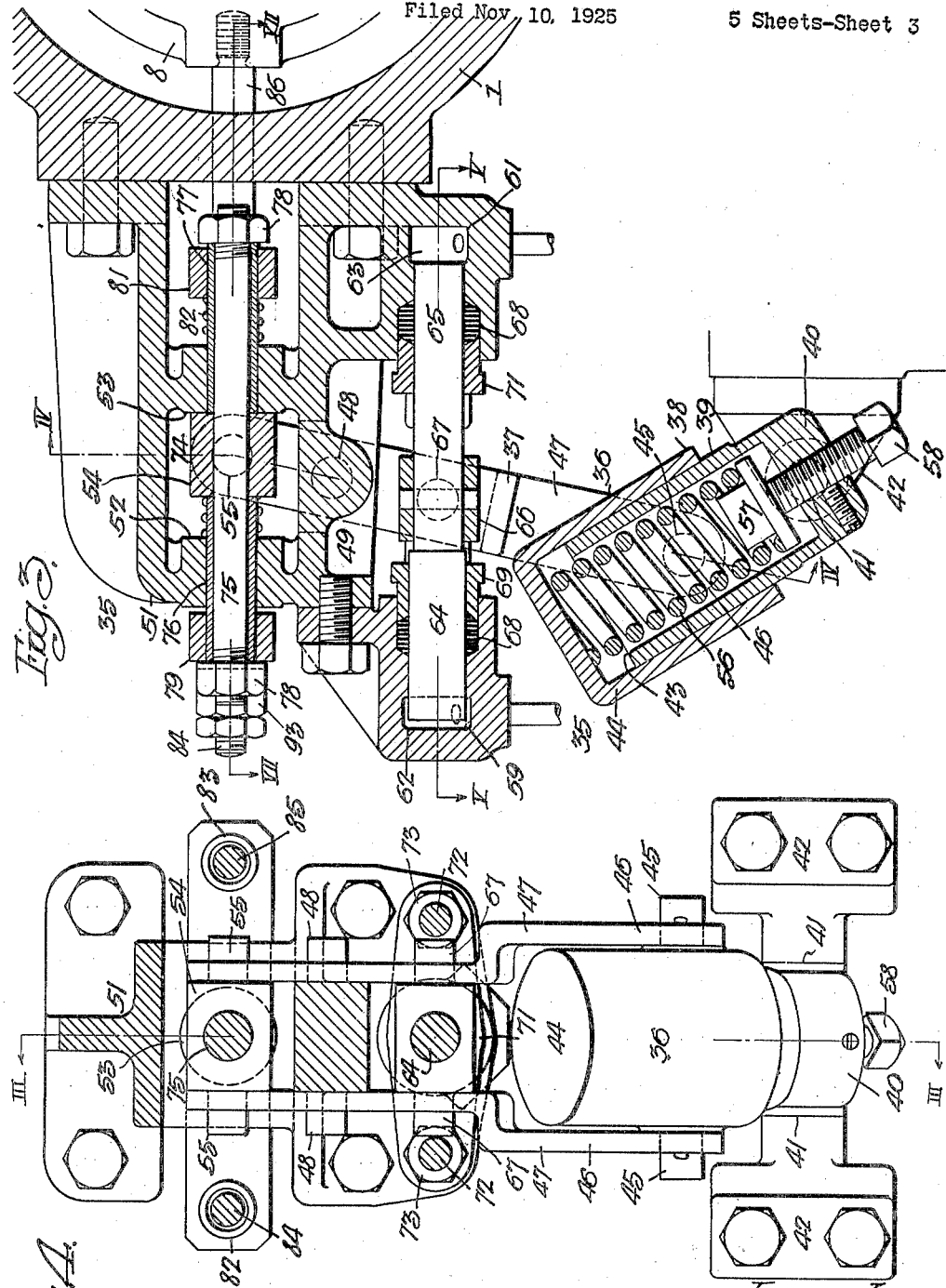

1,656,034

UNITED STATES PATENT OFFICE.

EARL CANNON, OF PHILADELPHIA, PENNSYLVANIA, ASSIGNOR TO AMERICAN FLUID MOTORS COMPANY, OF PHILADELPHIA, PENNSYLVANIA, A CORPORATION OF PENNSYLVANIA.

HYDRAULIC-CONTROL SYSTEM.

Application filed November 10, 1925. Serial No. 68,184.

My invention relates to fluid apparatus, and it has particular relation to control mechanism therefor.

In its broad aspect, an object of my invention is to provide simple, compact and reliable mechanism for automatically controlling the flow of fluid in a power system.

A more specific object of my invention is to provide mechanism that shall automatically reverse the flow of fluid in a power system only when the pressure therein reaches a predetermined maximum value.

Another object of my invention is to provide automatic control mechanism for a fluid pump that shall counteract the natural tendency of the pump to return to neutral.

A further object of my invention is to provide spring-loaded toggle mechanism for actuating the flow-controlling element of the fluid system, together with an actuating device for said toggle mechanism that shall operate at different pressures for the opposite sides of the fluid system.

A still further object of my invention is to provide a pump-reversing element with manually-operative control mechanism and an indicator therefor, whereby the discharge of the pump may be easily ascertained.

Other objects and applications of my invention, as well as details of construction and operation, will appear more fully hereinafter, when taken in connection with the accompanying drawings, wherein Fig. 1 is a top-plan view of the pump and associated control mechanism embodying my invention;

Fig. 2 is an end elevational view of the structure of Fig. 1;

Fig. 3 is an enlarged detail sectional view of the toggle control mechanism for the pump-reversing element, the sectional plane being taken on the line III—III of Fig. 1;

Fig. 4 is a transverse sectional view taken on the line IV—IV of Fig. 3;

Fig. 5 is a horizontal sectional view taken on the line V—V of Fig. 3;

Fig. 6 is a similar view illustrating the position of certain of the toggle-operated parts when the toggle passes through its mid position.

Fig. 7 is a view similar to Fig. 6 taken on the line VII—VII of Fig. 3, but showing the position of the parts when the toggle is in the position illustrated in Fig. 3;

Fig. 8 is a similar view, but illustrates the effect of actuating the toggle into its other position;

Figs. 9 and 10 are enlarged detail side and end elevation views, respectively, illustrating the timer and indicating mechanism in the neutral or mid-position.

Fig. 11 is a horizontal sectional view taken on the line XI—XI of Fig. 9 but illustrating the stop nuts separated and the pump-control element in the position corresponding to that of Fig. 3.

In the illustrated embodiment of my invention shown in the drawings, a variable-capacity pump 1 is mounted on a bed plate 2 constituting a fluid storage reservoir 3 and it is driven by a motor 4 which may take the form of a constant-speed uni-directional prime mover. The pump 1 may be connected to a main fluid motor 5 through a pair of pipes 6 and 7. The fluid motor 5, for purposes of illustration, may represent a reciprocating ram for a stoker (not shown).

The pump 1 is preferably of the type described and claimed in the patent to Hele-Shaw and Martineau, No. 1,077,979, dated Nov. 11, 1913, and it includes a stroke-controlling element 8, whereby the quantity and direction of flow of fluid through the pipes 6 and 7 may be varied, the construction being such that when the shiftable element 8 is in the position shown in Fig. 8, fluid is delivered under pressure through the pipe 6 and is drawn into the pump 1 through the pipe 7, but when the control element 8 is in the opposite position shown in Figs. 3 and 7, fluid is delivered through the pipe 7 and drawn in through the pipe 6. However, when the shiftable element 8 is in an intermediate or neutral position, there is no flow through either of the pipes 6 or 7.

The stroke of the shiftable element 8 may be controlled by timer mechanism 9, of which Figs. 9 and 10 are enlarged detail views. This mechanism comprises a pair of spaced rods 11 which are secured to the control element 8. The outer ends of these rods rigidly support a cross-head 12 which may be actuated in opposite directions between a pair of spaced stop-nuts 13 and 14. These nuts are respectively mounted on oppositely threaded sections 15 and 16 of a shaft 17 that is journaled in a bearing 18 supported by a bracket 19.

When the shaft 17 is turned in one direction, the stop-nuts 13 and 14 separate to increase the space therebetween and consequently the movement of the cross-head 12 and the control element 8. However, when the shaft 17 is turned in the opposite direction, the stop-nuts 13 and 14 are moved together to decrease the movement of the cross-head 12. When the nuts 13 and 14 finally clamp the cross-head 12 to prevent a further movement thereof, the control element 8 is in the mid or neutral position. Should it be desirable to permit the control element 8 to move in one direction a greater amount than in the other, it is only necessary to vary the relative spacing of the stop-nuts 13 and 14 with respect to the cross-head 12. Such change thus permits the pump to deliver a greater volume of fluid to one side of the system than the other, and also affords an accurate neutral setting.

The stop-nuts 13 and 14 are prevented from turning, when the shaft 17 is actuated as above described, by means of a guiding rib 21, which extends upwardly from a lower arm 22 of the bracket 19 into recesses 23 in the stop-nuts 13 and 14. The lower arm 22 has one end secured to the pump 1 and the other end to an outer hub portion 24, which is provided with an internally threaded aperture 25 adapted to receive the correspondingly threaded bearing 18. The bearing 18 is thus adjustably mounted. The shaft 17 may be locked against axial movement by means of a pair of collars 26 operatively associated with opposite ends of the bearing 18. The supporting bracket 19 is provided with an additional arm 27 which extends from the hub portion 24 to the pump 1. A hand wheel 28 may be mounted on the outer end of the operating shaft 17.

Since it is desirable to know at all times the speed of the motor 5 as well as the volume discharged by the pump 1, I provide an indicator 29 which comprises a gear wheel 31 having a rotatable mounting on a stud 32 supported by the bracket arm 27. A pointer 33 is rigidly secured to the stud 32 adjacent to one face of said gear wheel 31. The latter may be actuated in accordance with a movement of the stop-nuts 13 and 14, and hence variations in the stroke of the pump 1, by means of a pinion 34 which is so mounted on the shaft 17 as to mesh with the gear wheel 31. The indicator 29 may be calibrated so as to have a zero setting when the control element 8 and associated parts are in the mid or neutral position shown in Fig. 9.

My invention also contemplates mechanism 35 whereby the stroke controlling element 8 may be positively actuated from one extreme position through neutral to the other extreme position only when the pressure in the power system exceeds a predetermined safe value. The mechanism 35 is also adapted to counteract the tendency for the stroke controlling element 8 to return from an advanced position to the neutral or mid position.

As shown in Figs. 3 to 8, inclusive, the mechanism 35 for accomplishing these desired results comprises a toggle 36 having an upper arm 37 and a lower arm 38. The lower arm 38 comprises a tubular section 39, a lower end 40 of which is closed and provided with trunnions 41 which are journaled in spaced bearings 42. An upper open end 43 of the tubular section 39 may be closed by a telescoping cap section 44 having trunnions 45 which are journaled in lower ends 46 of a pair of strap members 47 constituting the upper toggle arm 36. The strap members 47 may be pivotally mounted on a pin 48 that is supported on a section 49 of a bracket 51 carried by the pump 1. The portion of the bracket 51 immediately above the section 49 is recessed to provide spaced abutments 52 and 53 for a member 54 having trunnions 55 journaled in the adjacent ends of the strap members 47. The spacing of the abutments 52 and 53 corresponds to the maximum movement of the control element 8 which in turn is controlled by the maximum separation of the stop-nuts 13 and 14.

The member 54 may be resiliently held in engagement with one or the other of the abutments 52, 53, by means of a spring 56, one end of which abuts against the telescoping casing 44 and the other against an adjustable seat 57 mounted on a threaded screw 58 extending through the lower end 40 of the tubular section 39. Thus the member 54 may be actuated from engagement with one of the abutments, say 53, into engagement with the other abutment 52 only when the line of action of the spring 56 is sufficiently shifted from that shown in Fig. 3.

The toggle or so-called load-and-fire mechanism 36 may be actuated, as just described, by means of a pair of fluid motors 59 and 61 which are respectively connected to the opposite sides of the fluid power system represented by the pipes 6 and 7, the pump 1 and the reversible hydraulic motor 5. These motors comprise cylinders 62 and 63, constituting portions of the bracket 51, and a pair of interconnected plungers 64 and 65, respectively. A member 66 is rigidly secured to a central portion of the plungers 64, 65 and it is provided with trunnions 67 which are journaled in the strap sections 46 that constitute the upper toggle arm 37. Leakage around the plungers 64 and 65 may be prevented by packing 68 and a pair of glands 69 and 71 which are respectively clamped to the cylinders 62 and 63 by a pair of tie rods 72 and nuts 73, as shown particularly in Figs. 3 and 5.

Since the movement of the member 54 between the abutments 52 and 53 corresponds to the maximum movement of the stroke controlling element 8, I provide mechanism 74, Figs. 3 to 8, inclusive, which permits variations in the movement of the element 8 by the timer 9 independently of the spring-loaded toggle mechanism 36. The mechanism 74 comprises a rod 75 which supports the member 54 and extends through aligned apertures in the abutments 52 and 53. These apertures are sufficiently large to receive a pair of sleeves 76 and 77, respectively. The sleeves respectively abut against opposite sides of the member 54 and nuts 78 on the ends of the rod 75. Hence when the member 54 is actuated by the toggle mechanism 36, the rod 75 and the sleeves 76 and 77 are correspondingly moved.

A pair of cross-heads 79 and 81 are apertured to receive slidably the sleeves 76 and 77, respectively, and may be forced into engagement with the nuts 78 on the ends of the rod 75 by means of a pair of springs 82 and 83. The springs 82 and 83 encircle rods 84 and 85 which extend from a pair of guide rods 86 and 87 slidably mounted in the pump 1, respectively. The guide rods, 86 and 87, are connected to the stroke-controlling element 8. The rods 84 and 85 pass through apertures in the opposite ends of the inner cross-head 81 and are provided with shoulders 88 and 89 against which said cross-head may be actuated by the force of the springs 83 and 82. The outer cross-head 79 is similarly apertured to receive the ends of the rods 84 and 85 which respectively terminate in shoulders 91 and 92 formed by adjusting nuts 93 and 94.

Considering the operation of the toggle mechanism 36, when the member 54 is moved from the intermediate position shown in Fig. 6 to that in Figs. 3 and 7 under the action of said toggle mechanism, the mechanism 74 is moved bodily until the cross-head 12 engages the stop-nut 14 of the timer mechanism 9. Should the stop-nut 14 be so positioned that the cross-head 12 engages the same before the toggle-operated member 54 engages the abutment 53, the movement of said member 54 is not interfered with, inasmuch as the springs 82 and 83 collapse to permit the continued movement of the outer cross-head 79 and the rod 75. The final position of these parts is illustrated in Fig. 7. The force of the springs 82 and 83 is such that they not only counteract the normal tendency of the control element 8 to move to its mid-position, but also prevent a relative movement between the cross-head 79 and the spring supporting rods 84 and 85, until the control element 8 has moved the desired extent as defined by the position of the stop-nut 14.

When the toggle mechanism 36 is actuated from the advanced position of Figs. 3 and 7 through the neutral position of Fig. 6, the line of action of the spring 56 is changed, so that the member 54 is snapped into engagement with the opposite abutment 52. The position of the parts is now as shown in Fig. 8. Here again the nut 13 is so positioned by the timer mechanism 9 that the control element 8 cannot be moved the maximum distance from its mid-position, as defined by the space between the abutment 52 and the adjacent side of the member 54 when the latter is in the position, shown in Fig. 6. The line of action of the spring 56 being now in the opposite direction, the member 52 is positively held in engagement with the abutment 52 until a further operation of the toggle mechanism 36. The pump 1 is thus reversed for each movement of the toggle mechanism 36.

Considering the operation of the apparatus as a whole, when the driving motor 4 is supplied with currents, and the shiftable control element is maintained in its neutral position by the timer mechanism 9, the pump 1 fails to discharge through either of the pipes 6 and 7. However, when said timer mechanism 9 is operated to separate the stop-nuts 13 and 14, the shiftable element 8 is actuated under the force of the springs 82 and 83, until the cross-head 12 engages one or the other of the stop-nuts 13, 14, depending upon which abutment the toggle-actuated member 54 is in engagement with.

Assuming the parts to be in the position shown in Figs. 3 and 7, fluid is discharged through the pipe 7 to the reversible fluid motor 5. When the motor 5 has reached the end of its stroke, the pressure in the pipe 7 and consequently the fluid motor 59 builds up to a value sufficient to cause the latter to actuate the toggle arm 37 against the force of the spring 56 until the line of action of the latter changes, whereupon the toggle mechanism 36 and the control element 8 are snapped into the position shown in Fig. 8.

Thus the stroke-controlling element 8 is positively actuated from its advanced position in one direction to its advanced position in the other direction and the motor 5 correspondingly reversed only when the pressure in the fluid system reaches the predetermined value at which reversal is to occur. Moreover, the pump 1 is held on stroke independent of its tendency to return to its no-stroke or mid position. Should it be found desirable to cause the pressure in one side of the system, say 6, to reach a higher value than that on the other side before the pump 1 is reversed, the plunger 64 may be made larger than the plunger 65, as shown in Fig. 3.

While I have shown only one embodiment of my invention, for the purpose of describing the same and illustrating its principles of construction, it is apparent that various changes and modifications may be made therein without departing from the spirit and scope of my invention. I desire, therefore, that only such limitations shall be imposed thereon as are indicated in the appended claims or as are demanded by the prior art.

I claim:

1. A fluid system including a pump having a variable stroke and pressure-responsive snap means automatically operative to control the flow of fluid in said system, said means preventing variations in the stroke of said pump except under predetermined conditions.

2. A fluid system comprising a pump having pipes extending therefrom, and means including load-and-fire mechanism connected to be actuated by changes in the pressure of the fluid in said pipes for automatically causing a reversal of the fluid in said pipes.

3. Apparatus of the class described comprising a pump having a control element movable from one position to another, a pair of pipes connected to said pump, load-and-fire mechanism operative to actuate said element from one of said positions to the other, and a motor for actuating said mechanism responsive to predetermined pressure variations in said pipes.

4. A fluid system comprising a pump having a stroke controlling element, operating mechanism for said control element adapted to snap from one position to another, under a predetermined force, and a fluid motor adapted, under predetermined conditions, to exert said force on said mechanism.

5. A fluid pump having a control element movable a predetermined distance, operating means for said element comprising snap mechanism for moving said element through said distance, and means whereby the extent of movement of said element may be varied from that of said mechanism.

6. A fluid pump having a control element movable a predetermined distance, snap mechanism for actuating said element through said distance, and resilient means whereby the movement of said element may be varied relative to said mechanism.

7. A fluid pump having a control element adapted to be moved a predetermined distance, operating means for said element comprising snap mechanism having a predetermined movement, means whereby the extent of movement of said element may be varied from that of said mechanism, and pressure-responsive means operative on said snap mechanism.

8. A fluid pump having a control element movable through a predetermined distance, snap mechanism for actuating said element through said distance, the operating characteristics of said pump being such that said element tends to move from one predetermined position to another, and means for counteracting said tendency of the pump.

9. A fluid pump having a control element movable through a predetermined distance, mechanism for actuating said element through said distance, the characteristics of said pump being such that said element tends to move from one predetermined position to another, and means for counteracting said tendency of the pump, said means also permitting variations in the movement of said element relative to the movement of said mechanism.

10. A pump having a stroke-controlling element which tends to move from an advanced position to a neutral position, snap mechanism for actuating said element, and means for counteracting said tendency, said means also permitting changes in the extent of movement of said element relative to said mechanism.

11. A fluid system including a pump having a control element movable through a predetermined maximum distance, said element tending to move from one position to another, snap mechanism operative to actuate said element through said maximum distance, said mechanism including means for counteracting said tendency and for permitting a variation in the movement of said element independently of said mechanism, and pressure-responsive means operative on said mechanism.

12. A fluid system including a pump having a control element, pressure-responsive snap mechanism operative to actuate said element, and means for varying the time between successive operations of said mechanism.

13. A fluid system comprising a pump having a stroke-controlling element, a timer operatively associated with said element, and snap mechanism for actuating said element under predetermined conditions.

14. The combination with a pump having a stroke-controlling element, of a timer for varying at will the position of said element and provided with indicating means, and a device responsive to pressure changes in said system for automatically actuating said element.

15. In a fluid system, the combination with a pump having pipes leading therefrom and means for controlling the flow of fluid in said pipes, of a spring-loaded toggle operative on said means and pressure-responsive means operative on said toggle.

16. In a fluid system, the combination with a pump having pipes leading therefrom and means for controlling the flow of fluid in said pipes, of a spring-loaded toggle responsive to predetermined pressure conditions in said system, and resilient means for operatively associating said toggle and said first-mentioned means, said resilient means being responsive to a force less than that necessary to operate said toggle.

17. Apparatus of the class described comprising a toggle, one of the arms of which is provided with spring-loaded telescoping sections, and pump control mechanism adapted to be actuated by the other arm.

18. Apparatus of the class described comprising a pair of pivoted toggle arms, adjacent ends of which have a common pivotal connection, one of said arms being so formed as to cause said toggle to snap from one position to another upon a predetermined movement thereof, a control element connected to be actuated by the other of said arms, and a fluid motor operative on said last-mentioned arm.

19. A fluid system comprising a pump and snap mechanism responsive to the pressure in said system for automatically controlling said pump, said mechanism comprising a toggle, one of the arms of which comprises a pair of sections, and resilient means tending to separate said sections.

20. A fluid system comprising a pump, control mechanism for said pump adapted to snap from one position to another, said mechanism comprising a toggle, one of the arms of which comprises a pair of sections, resilient means tending to separate said sections, and a fluid motor operatively associated with the other arm of said toggle for causing the line of action of said spring to shift sufficiently to cause said toggle to snap into its other position.

21. A fluid system comprising, means for controlling the flow of fluid in said system, snap mechanism for actuating said means, and pressure-responsive means for actuating said mechanism, said last-mentioned means being such that it is responsive to different pressures for opposite sides of the system.

22. A fluid system including a pump having means for controlling the flow of fluid in said system, snap mechanism for actuating said means, and a pair of motors respectively connected to the sides of said system, said motors being adapted to cause opposite movements of said snap mechanism respectively.

23. A fluid system comprising, means for controlling the flow of fluid in said system, snap mechanism for actuating said means, and a pair of fluid motors connected to the respective sides of said system and adapted to actuate successively said snap mechanism, one of said motors requiring a higher operating pressure than the other.

24. In apparatus of the class described, a pump and control means therefor comprising a pair of movable guide rods, each of said rods having a pair of spaced shoulders, a pair of cross-heads slidably mounted on the portions of said rods intermediate said shoulders, springs for causing said cross-heads to engage said shoulders, the force of said springs being sufficient to counteract the tendency of the pump to return to its neutral position, a rod extending between said cross-heads provided with shoulders on the outer ends thereof, a member mounted on said last-mentioned rod and a pair of abutments respectively positioned on opposite sides of said member and extending into engagement with the shoulders on said last-mentioned rod.

25. In apparatus of the class described, a pump and control means therefor comprising a pair of movable guide rods, each of said rods having a pair of spaced shoulders, a pair of cross-heads slidably mounted on the portions of said rods intermediate said shoulders, springs for causing said cross-heads to engage said shoulders, the force of said springs being sufficient to counteract the tendency of the pump to return to the neutral position, a rod extending between said cross-heads provided with shoulders on the outer ends thereof, a member mounted on said last-mentioned rod, a pair of sleeves extending respectively from opposite sides of said member to the shoulders on the opposite ends of said last-mentioned rod and abutments for limiting opposite movements of said member.

26. In combination, a pump, control means therefor comprising a pair of movable guide rods, each of said rods having a pair of spaced shoulders, a pair of cross-heads slidably mounted on the portions of said rods intermediate said shoulders, springs for causing said cross-heads to engage said shoulders, the force of said springs being sufficient to counteract the tendency of the pump to return to its neutral position, a rod extending between said cross-heads provided with shoulders on the outer ends thereof, a member mounted on said last-mentioned rod and a pair of abutments respectively positioned on opposite sides of said member and extending into engagement with the shoulders on said last-mentioned rod, and snap mechanism operative under predetermined conditions to actuate said member in opposite directions.

27. A fluid system comprising a pair of pipes, a pump for delivering fluid to one of said pipes, and means including snap mechanism operative to cause said pump to deliver fluid to the other of said pipes when the fluid in said first-mentioned pipe exceeds a predetermined value.

28. In a fluid system, the combination with a variable capacity fluid pump having a stroke controlling element, of means responsive to pressure changes in said system for controlling the operation of said pump, said means including a spring loaded toggle operatively associated with said stroke controlling element.

EARL CANNON.